(12) United States Patent
Komori (10) Patent No.: US 8,322,867 B2
(45) Date of Patent: Dec. 4, 2012

(54) PROJECTOR APPARATUS

(75) Inventor: Takanao Komori, Kanagawa (JP)

(73) Assignee: Sony Corporation, Tokyo (JP)

( * ) Notice: Subject to any disclaimer, the term of this patent is extended or adjusted under 35 U.S.C. 154(b) by 147 days.

(21) Appl. No.: 12/778,559

(22) Filed: May 12, 2010

(65) Prior Publication Data

US 2010/0315599 A1 Dec. 16, 2010

(30) Foreign Application Priority Data

Jun. 12, 2009 (JP) ................................. 2009-141005

(51) Int. Cl.
*G03B 21/14* (2006.01)

(52) U.S. Cl. .............. 353/119; 353/52; 353/54; 353/55; 353/56; 353/57; 353/58; 353/59; 353/60; 353/61; 165/80.3; 361/694

(58) Field of Classification Search .............. 353/52–61, 353/119, 122; 165/129, 80.3, 104, 104.11; 349/5, 7, 8, 9; 361/690, 694
See application file for complete search history.

(56) References Cited

U.S. PATENT DOCUMENTS

| | | | | |
|---|---|---|---|---|
| 4,669,865 A | * | 6/1987 | Bessho et al. | 355/30 |
| 6,007,205 A | * | 12/1999 | Fujimori | 353/57 |
| 6,139,154 A | * | 10/2000 | Haba | 353/31 |
| 6,350,033 B1 | * | 2/2002 | Fujimori | 353/61 |
| 7,276,108 B2 | * | 10/2007 | Wei et al. | 95/282 |
| 7,535,711 B2 | * | 5/2009 | Saegusa et al. | 361/695 |
| 7,537,349 B2 | * | 5/2009 | Kinoshita et al. | 353/54 |
| 7,884,887 B2 | * | 2/2011 | Yoshimura | 349/5 |
| 7,993,009 B2 | * | 8/2011 | Tsuchiya et al. | 353/54 |
| 2008/0316436 A1 | * | 12/2008 | Lee | 353/61 |
| 2009/0190100 A1 | * | 7/2009 | Tanaka et al. | 353/61 |

FOREIGN PATENT DOCUMENTS

| | | |
|---|---|---|
| JP | 8-152242 | 6/1996 |
| JP | 8-291928 | 11/1996 |
| JP | 2005-312665 | 11/2005 |
| JP | 2009-18244 | 1/2009 |

OTHER PUBLICATIONS

U.S. Appl. No. 12/694,581, filed Jan. 27, 2010, Komori.

* cited by examiner

*Primary Examiner* — Georgia Y Epps
*Assistant Examiner* — Sultan Chowdhury
(74) *Attorney, Agent, or Firm* — Oblon, Spivak, McClelland, Maier & Neustadt, L.L.P.

(57) ABSTRACT

A projector apparatus includes a housing having an air inlet and an air outlet, a light source device provided in the housing, an image projection unit provided in the housing and configured to emit an image projection light beam so as to project an image onto a screen, and a cooling device configured to cool the light source device and the image projecting unit. The cooling device includes a cooling passage extending from the air inlet to the air outlet, and a fan configured to suck in outside air from the air inlet and to exhaust the outside air passing through the cooling passage, out of the housing from the air outlet. The air filter section includes a cylindrical filter body, a filter support member configured to support the filter body, and a rotating unit configured to rotate the filter support member.

8 Claims, 12 Drawing Sheets

PROJECTOR APPARATUS

BACKGROUND OF THE INVENTION

1. Field of the Invention

The present invention relates to a projector apparatus.

2. Description of the Related Art

Projector apparatuses have been proposed, each of which include a housing, and a light source device and an image projecting unit that are provided in the housing.

The light source device uses a high-output discharge lamp as a lamp for generating light.

The image projecting unit produces an image projection light beam from light generated by the light source device, and emits the image projection light beam to project an image onto a screen. The image projecting unit includes an optical modulator, such as a liquid crystal panel, for modulating the light emitted from the lamp, and various optical elements through which the light from the lamp passes.

The temperature of the light source device increases to a high temperature with light emission from the lamp, and the temperature of the image projecting unit is increased by the light received from the light source device by the optical modulator and the optical elements.

Hence, the light source device and the image projecting unit are cooled by cooling air in order to achieve stable operations and longer lives of the light source device and the image projecting unit.

Accordingly, a cooling device is provided in the projector apparatus of the related art. The cooling device guides outside air into the housing to cool the light source device and the image projecting unit, and exhausts the outside air after cooling.

As such a cooling device, a cooling device including an air inlet and an air outlet provided in a housing, a plate-shaped air filter provided near the air inlet, and a fan has been proposed.

The fan sucks outside air into the housing from the air inlet via the air filter, and exhausts the outside air from the housing through the air outlet after the outside air cools the light source device and the image projecting unit.

The air filter filters outside air to remove dust from the outside air, and thereby prevents dust from adhering to the light source device and the image projecting unit.

Unfortunately, dust accumulates on the air filter as the operating time of the cooling device elapses, and clogs the air filter eventually.

When clogging occurs, the amount of air passing through the air filter decreases, and the cooling effect is reduced. As a result, it is difficult to sufficiently cool the light source device and the image projecting unit.

For this reason, an operation of detaching a cover from the housing and replacing the air filter in the housing is performed frequently. This operation of replacing the air filter is troublesome to the user.

Accordingly, Japanese Unexamined Patent Application Publication No. 8-1152242 discloses a projector apparatus in which an air filter is wound around a supply roll and is paid out from the supply roll when used.

In this projector apparatus, a portion of the air filter clogged with adhering dust is sequentially wound around a take-up roll so that an unused portion of the air filter can be used.

SUMMARY OF THE INVENTION

However, outside air that passes through the air inlet and the air filter and flows in the housing is not uniformly distributed over the entire surface of the air filter, and often concentrates at a part of the surface of the air filter.

For this reason, dust contained in the outside air concentrates at a part of the air filter, and the air filter is apt to be partly clogged with dust.

In this case, the amount of air passing through the air filter decreases although the other part of the air filter is not clogged, and therefore, the cooling effect decreases.

Consequently, the clogged part of the air filter is wound up to use an unused portion of the air filter, and this wastes the air filter, in other words, a filter member.

The present invention has been made in view of these circumstances, and it is desirable to provide a projector apparatus that advantageously suppresses reduction of a cooling effect and extends the life of a filter member.

A projector apparatus according to an embodiment of the present invention includes a housing having an air inlet and an air outlet: a light source device provided in the housing; an image projection unit provided in the housing and configured to generate an image projection light beam from light from the light source device and to emit the image projection light beam so as to project an image onto a screen; and a cooling device configured to cool the light source device and the image projecting unit. The cooling device includes a cooling passage extending from the air inlet to the air outlet through an air filter section, the light source device, and the image projecting unit, and a fan configured to suck in outside air from the air inlet, to cause the outside air to flow through the cooling passage, and to exhaust the outside air out of the housing from the air outlet. The air filter section includes a cylindrical filter body, a filter support member configured to support the filter body, and a rotating unit configured to rotate the filter support member on a center axis of the filter body. In the air filter section, after the outside air flows from an outer peripheral surface to an inner peripheral portion of the filter body and dust is removed from the outside air by the filter body, the outside air flows out of the filter body in an axial direction of the filter body.

According to the embodiment of the present invention, the filter body is cylindrical, and is rotated by the rotating unit.

Hence, even when the amount of outside air passing through the filter body is not uniformly distributed on the outer peripheral surface of the filter body, but concentrates at a part of the outer peripheral surface, concentration of dust at the part of the filter body is suppressed by the rotation of the filter body.

Therefore, the amount of air passing through the air filter does not easily decrease even during a long use period of the filter body. This advantageously suppresses reduction of the cooling effect, and extends the life of the filter body.

DESCRIPTION OF THE PREFERRED EMBODIMENTS

First Embodiment

Next, a first embodiment of the present invention will be described with reference to FIGS. 1 to 12.

Figure 1:
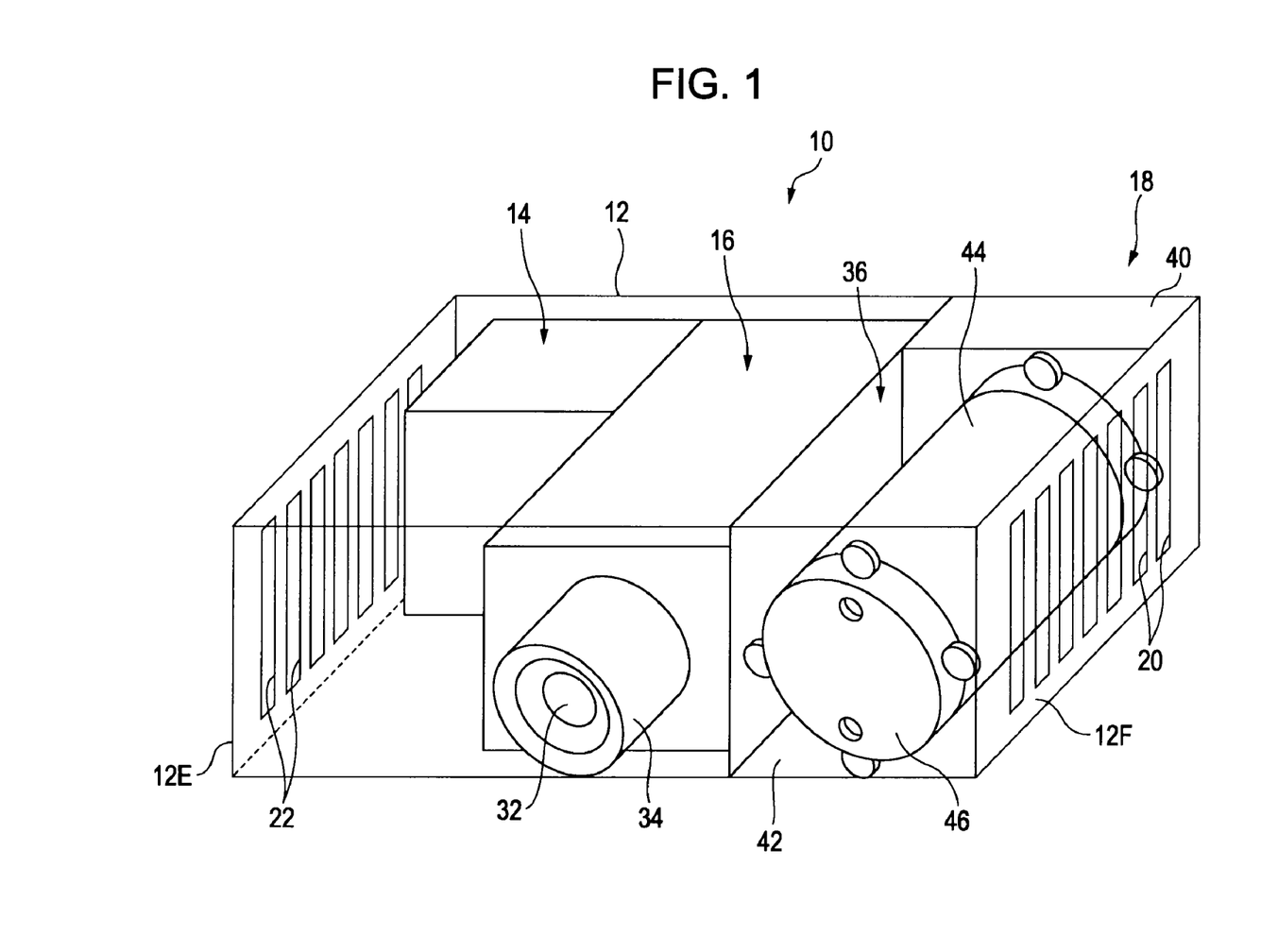
FIG. 1 is a perspective view of a projector apparatus according to an embodiment of the present invention.
Figure 2:
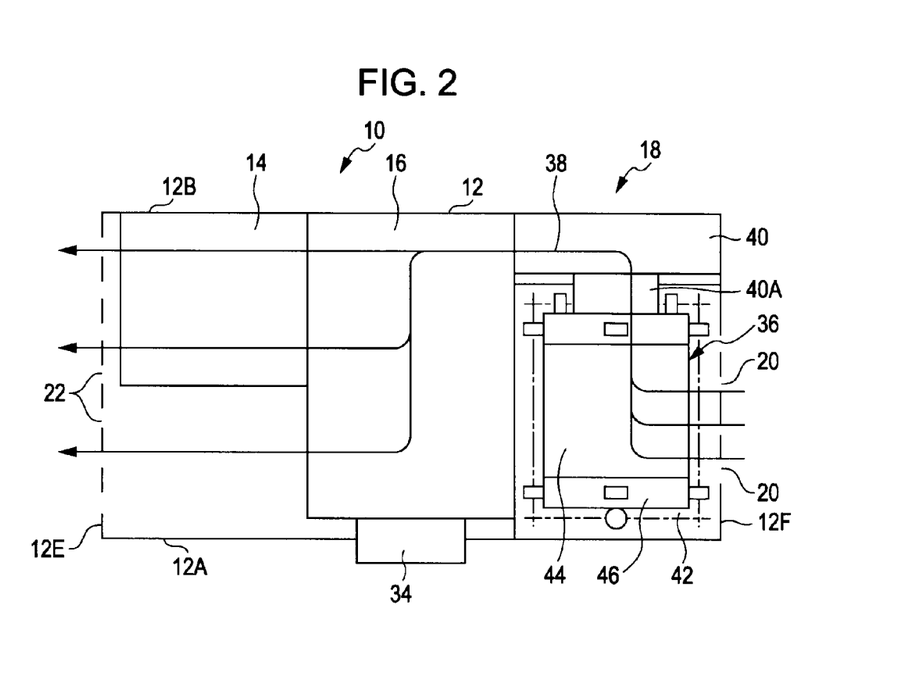
FIG. 2 is a plan view of the projector apparatus shown in FIG. 1.
Figure 3:
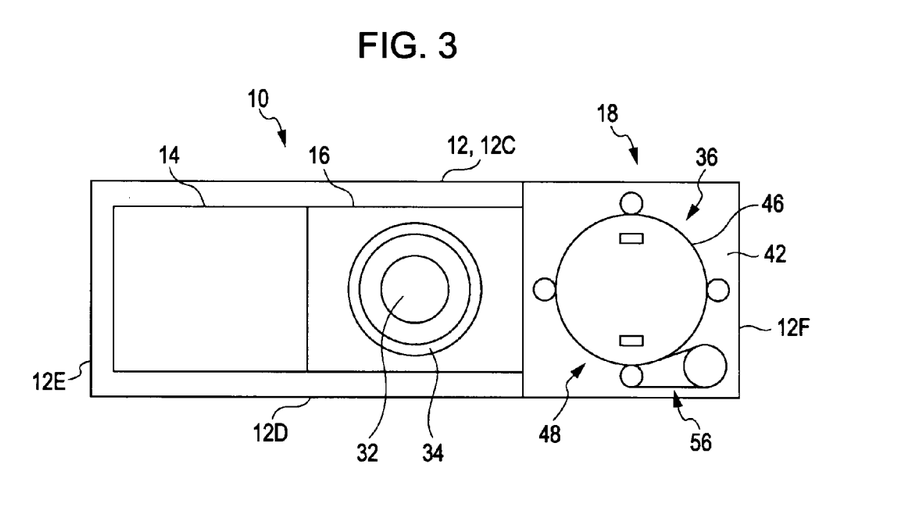
FIG. 3 is a front view of the projector apparatus.

As shown in FIGS. 1 to 3, a projector apparatus 10 of the first embodiment includes a housing 12, a light source device 14, an image projecting unit 16, and a cooling device 18.

The housing 12 is shaped like a flat rectangular plate having a height, a length larger than the height, and a width larger than the length. The housing 12 includes a front surface 12A, a rear surface 12B, an upper surface 12C, a lower surface 12D, and left and right surfaces 12E and 12F.

In the first embodiment, in a state in which the projector apparatus 10 is viewed from a screen 2, a side of the screen 2 is referred to as a front side, and an opposite side is referred to as a rear side. Right and left sides are referred to as right and left sides provided when the projector apparatus 10 is viewed from the front side.

A lens barrel 34 is provided at almost the widthwise center of the front surface 12A. Air inlets 20 for taking outside air into the housing 12 are provided in the right surface 12F. In the first embodiment, the air inlets 20 are formed by multiple slits provided in the right surface 12F.

Air outlets 22 for exhausting air from the housing 12 are provided in the left surface 12E. In the first embodiment, the air outlets 22 are formed by multiple slits provided over the entire left surface 12E.

As shown in FIGS. 2 and 3, the light source device 14, the image projecting unit 16, and the cooling device 18 are contained in the housing 12. In the first embodiment, the light source device 14, the image projecting unit 16, and the cooling device 18 are arranged in this order from left to right in the width direction of the housing 12 in plan view.

Figure 4:
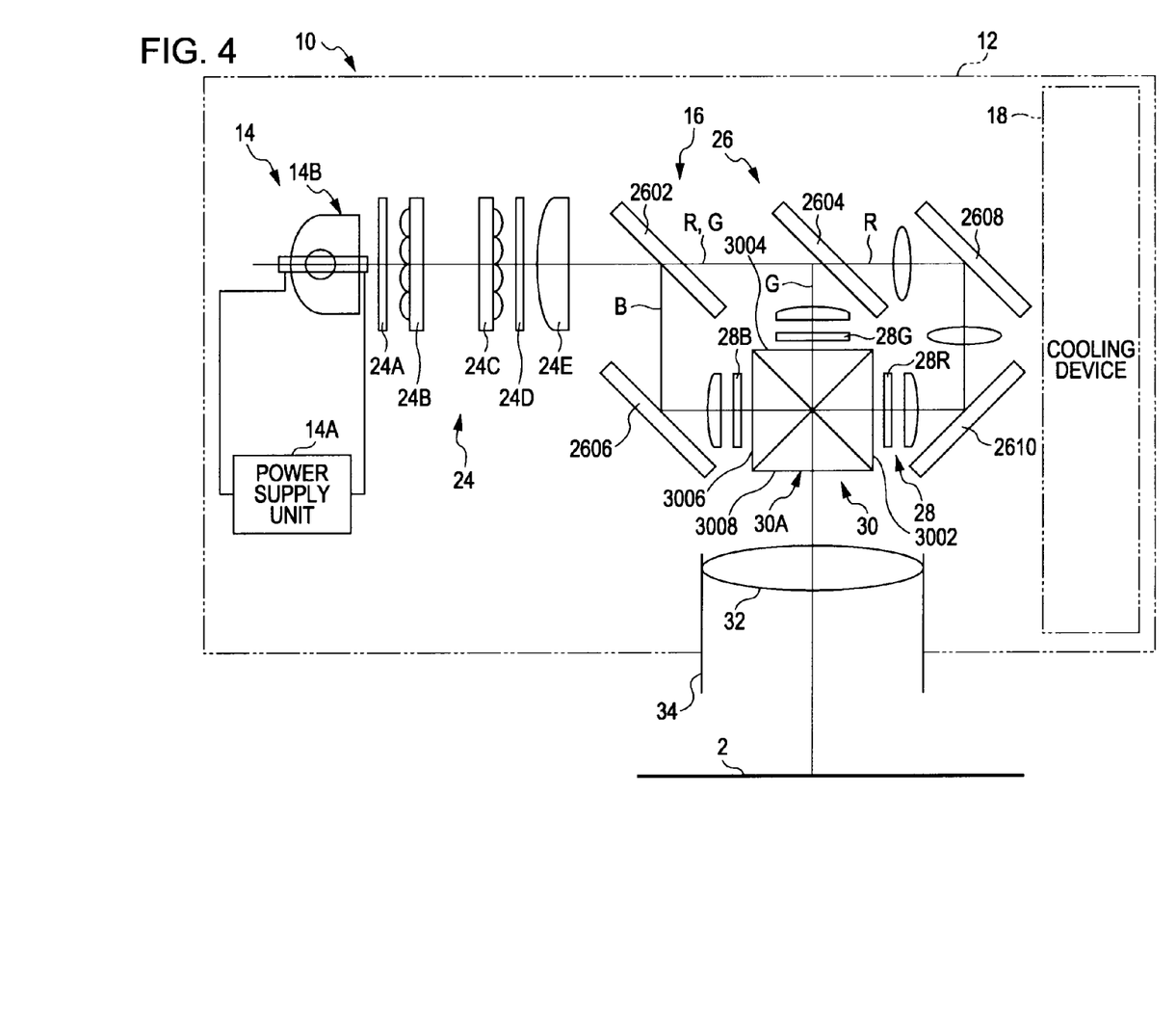
FIG. 4 is a structural view of the projector apparatus.

Referring to FIG. 4, the light source device 14 includes a power supply unit 14A and a lamp 14B. The power supply unit 14A supplies power to the lamp 14B. The lamp 14B is driven by power supplied from the power supply unit 14A so as to generate image projection light, and adopts a white light source for emitting light having a visible spectrum. As the lamp 14B, various continuous spectrum light sources of the related art, such as a xenon lamp, a high-pressure mercury lamp, and a metal halide lamp, can be used.

Since the temperature of the lamp 14B increases to a high temperature with light emission, the lamp 14B is cooled by cooling air in order to ensure a high brightness (in other words, stable operation) and a longer life thereof.

As shown in FIG. 4, the image projecting unit 16 produces an image projection light beam using light from the light source device 14, and emits the image projection light beam to project an image onto the screen 2.

The image projecting unit 16 includes an illumination optical unit 24, a separation unit 26, an image modulation unit 28, an image synthesizing unit 30, and a projection optical system 32.

The illumination optical unit 24 blocks part of light emitted from the light source device 14 to make the illuminance of the light uniform, and guides the light to the separation unit 26.

In the first embodiment, the illumination optical unit 24 includes an ultraviolet-infrared cut filter 24 for blocking ultraviolet and infrared rays, two fly-eye lenses 24B and 24C for making the illuminance of light uniform, a polarization conversion element 24D, and a condenser lens 24E.

By blocking ultraviolet and infrared rays contained in the light emitted from the light source device 14 with the ultraviolet-infrared cut filter 24A, various optical components that form the separation unit 26, the image modulation unit 28, the image synthesizing unit 30, and the projection optical system 32 are prevented from heating and degradation.

The separation unit 26 separates light (white light), which is guided from the illumination optical unit 24 and has a uniform illuminance, into light beams of three colors of red (R), green (G), and blue (B). For example, the separation unit 26 includes a plurality of dichroic mirrors and so on.

More specifically, in the first embodiment, the separation unit 26 includes first and second dichroic mirrors 2602 and 2604, and first to third mirrors 2606, 2608, and 2610.

The first dichroic mirror 2602 transmits red and green light beams R and G, of the light guided from the illumination optical unit 24, and reflects a blue light beam B.

The second dichroic mirror 2604 transmits the red light beam R, of the red and green light beams R and G passing through the first dichroic mirror 2602, and reflects the green light beam G.

Thus, the light guided from the illumination optical unit 24 to the first dichroic mirror 2602 is separated into two light beams, that is, the blue light beam B and the red/green light beam R/G by the first dichroic mirror 2602.

The blue light beam B separated by the first dichroic mirror 2602 is reflected by the first mirror 2606.

The green light beam G, of the red/green light beam R/G separated by the first dichroic mirror 2602, reaches the second dichroic mirror 2604.

The red light beam R, of the red/green light beam R/G separated by the first dichroic mirror 2602, passes through the second dichroic mirror 2604, reaches the third mirror 2610 via the second mirror 2608, and is reflected by the third dichroic mirror 2610.

The red, green, and blue light beams R, G, and B thus separated by the separation unit 26 are emitted from the separation unit 26 toward the image modulation unit 28.

The separation unit 26 can adopt various structures of the related art as long as it has a function of separating light (white light) guided from the illumination optical unit 24 into light beams of three colors, red, green, and blue R, G, and B.

The image modulation unit 28 modulates the three light beams R, G, and B guided from the separation unit 26 according to image information, and supplies the modulated light beams to the image synthesizing unit 30.

The image modulation unit 28 includes first to third image modulation elements 28R, 28G, and 28B corresponding to the three light beams R, G, and B. In the first embodiment, the first to third image modulation elements 28R, 28G, and 28B are formed by transmissive liquid crystal display devices (liquid crystal light valves). Each liquid crystal display device includes a device body having two transparent substrates between which a liquid crystal layer is sealed, and a polarizing plate incorporated in the device body.

The first to third image modulation elements 28R, 28G, and 28B have display surfaces, and display images on the display surfaces by receiving image signals (driving signals) corresponding to information about three color images of red, green, and blue.

The red light beam R emitted from the separation unit 26 to the image modulation unit 28 is modulated according to the image information when passing through the first image modulation element 28R, and is guided to the image synthesizing unit 30.

The green light beam G emitted from the separation unit 26 to the image modulation unit 28 is modulated according to the image information when passing through the second image modulation element 28G, and is guided to the image synthesizing unit 30.

The blue light beam B emitted from the separation unit 26 to the image modulation unit 28 is modulated according to the image information when passing through the third image modulation element 28B, and is guided to the image synthesizing unit 30.

The first to third image modulation elements 28R, 28G, and 28B may be formed by reflective liquid crystal display devices or various image display devices of the related art, instead of the transmissive liquid crystal display devices. The image display devices are not limited to the above-described liquid crystal display devices, and may be formed by various types of image display devices of the related art.

The image synthesizing unit 30 generates one image projection light beam by synthesizing the three light beams R, G, and B modulated by the image modulation unit 28, and guides the image projection light beam to the projection optical system 32. In the first embodiment, the image synthesizing unit 30 is formed by a crossed prism 30A.

The crossed prism 30A includes three incident surfaces 3002, 3004, and 3006 on which the light beams from the first to third image modulation elements 28R, 28G, and 28B are incident, respectively. The incident surfaces 3002, 3004, and 3006 are orthogonal to one another.

The crossed prism 30A also includes an emitting surface 3008 from which the image projection light beam generated by synthesizing the three light beams R, G, and B is emitted.

The image synthesizing unit 30 is not limited to the crossed prism 30A as long as it can generate one image projection light beam by synthesizing three light beams R, G, and B. The image synthesizing unit 30 may be formed by various optical elements of the related art.

The projection optical system 32 receives the image projection light beam guided from the image synthesizing unit 30, and projects the image projection light beam onto the screen 2. The projection optical system 32 includes a plurality of lenses.

In the first embodiment, the projection optical system 32 is housed in the above-described lens barrel 34, and the front of the lens barrel 34 protrudes frontward from the front surface 12A of the housing 12.

The temperatures of the illumination optical unit 24, the separation unit 26, the image modulation unit 28, the image synthesizing unit 30, and the projection optical system 32, which constitute the image projecting unit 16, are increased to high temperatures by passage of the light emitted from the lamp 14B.

Therefore, these components are cooled by cooling air in order to stabilize the operations of the components and to extend the lives of the components.

Next, the cooling device 18 that is the gist of the embodiment of the present invention will be described.

As shown in FIGS. 1 to 3, the cooling device 18 includes an air filter section 36, a cooling passage 38, and a fan 40.

The cooling passage 38 is a passage through which outside air flows in the housing 12, and extends from the air inlets 20 to the air outlets 22 via the air filter section 36, the light source device 14, and the image projecting unit 16.

The fan 40 sucks in outside air through the air inlets 20, causes the outside air to flow through the cooling passage 38, and exhausts the outside air out of the housing 12 through the air outlets 22.

In the first embodiment, the fan 40 is formed by a sirocco fan having rotary blades. The fan 40 sucks in air in the axial direction of the rotary blades and exhausts the air outside in the radial direction of the rotary blades.

The fan 40 is provided in the right rear of the housing 12 in a manner such that the axial direction of the rotary blades coincides with the front-rear direction of the housing 12. The fan 40 includes a suction port 40A (suction duct) from which air is sucked in, and an exhaust port from which air is exhausted.

The fan 40 can be formed not only by the sirocco fan, but also by various fans of the related art, for example, an axial fan.

Figure 5A:
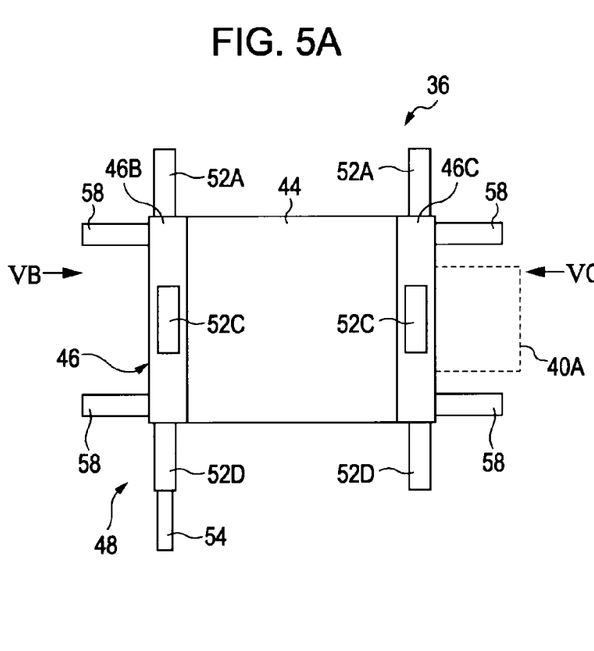
FIG. 5A is a front view of an air filter section.
Figure 5B:
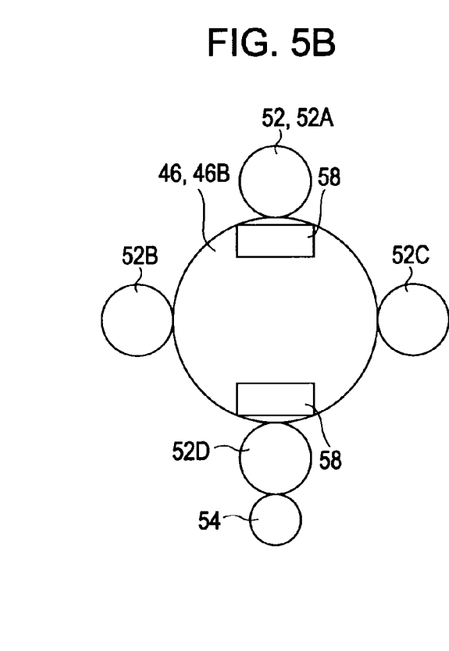
FIG. 5B is a view on arrow VB of FIG. 5A.
Figure 5C:
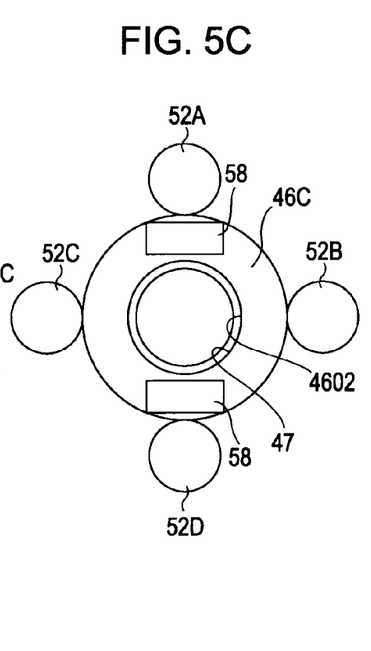
FIG. 5C is a view on arrow VC of FIG. 5A.

As shown in FIGS. 2 and 5, the air filter section 36 includes a filter storage chamber 42, a filter body 44, a filter support member 46, and a rotating unit 48.

Figure 10A:
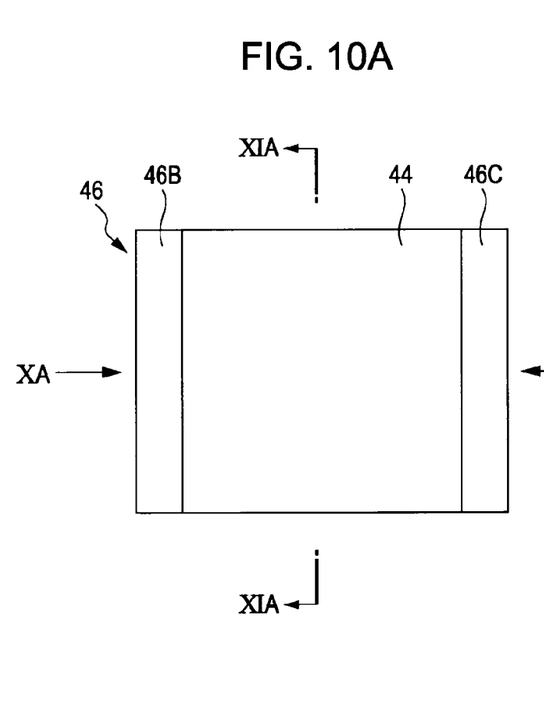
FIG. 10A is a front view of a filter body supported by a filter support member.
Figure 10B:
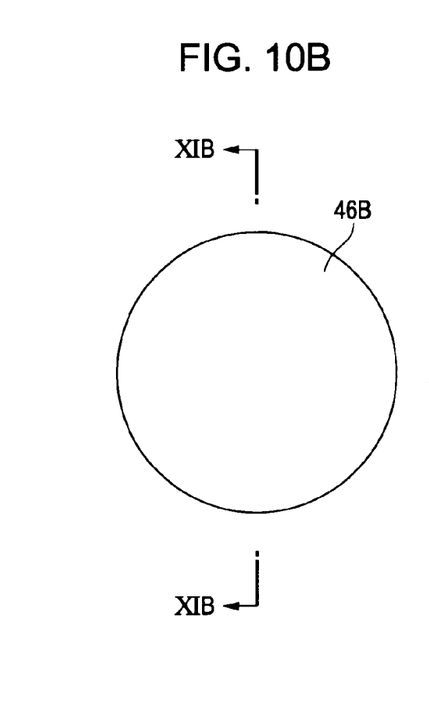
FIG. 10B is a view on arrow XA of FIG. 10A.
Figure 10C:
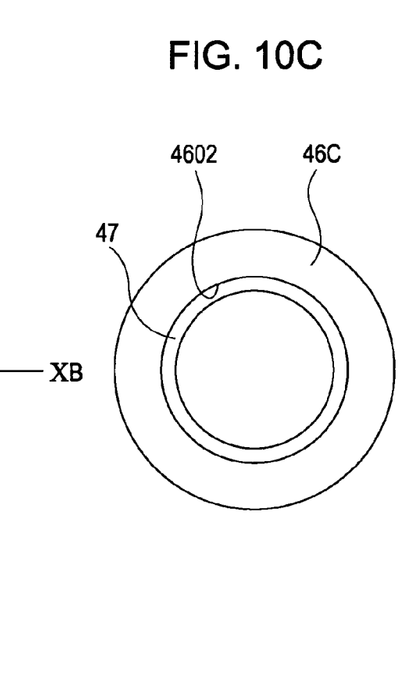
FIG. 10O is a view on arrow XB of FIG. 10A.
Figure 11A:
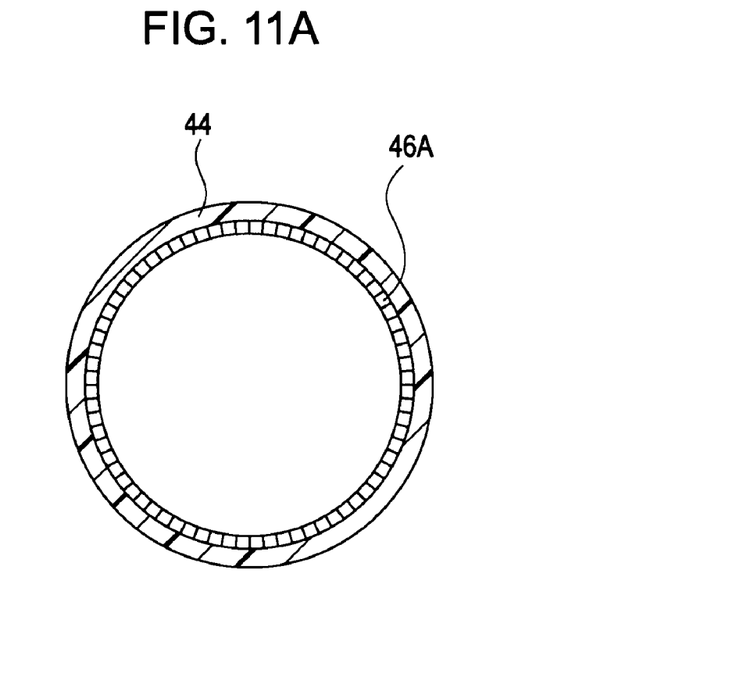
FIG. 11A is a sectional view taken along line XIA-XIA in FIG. 10A.

FIG. 10A is a front view of the filter body 44 supported by the filter support member 46, FIG. 10B is a view on arrow XA of FIG. 10A, and FIG. 10C is a view on arrow XB of FIG. 10A. FIG. 11A is a cross-sectional view taken along line XIA-XIA in FIG. 10A, and FIG. 11B is a cross-sectional view taken along line XIB-XIB in FIG. 10B.

Figure 11B:
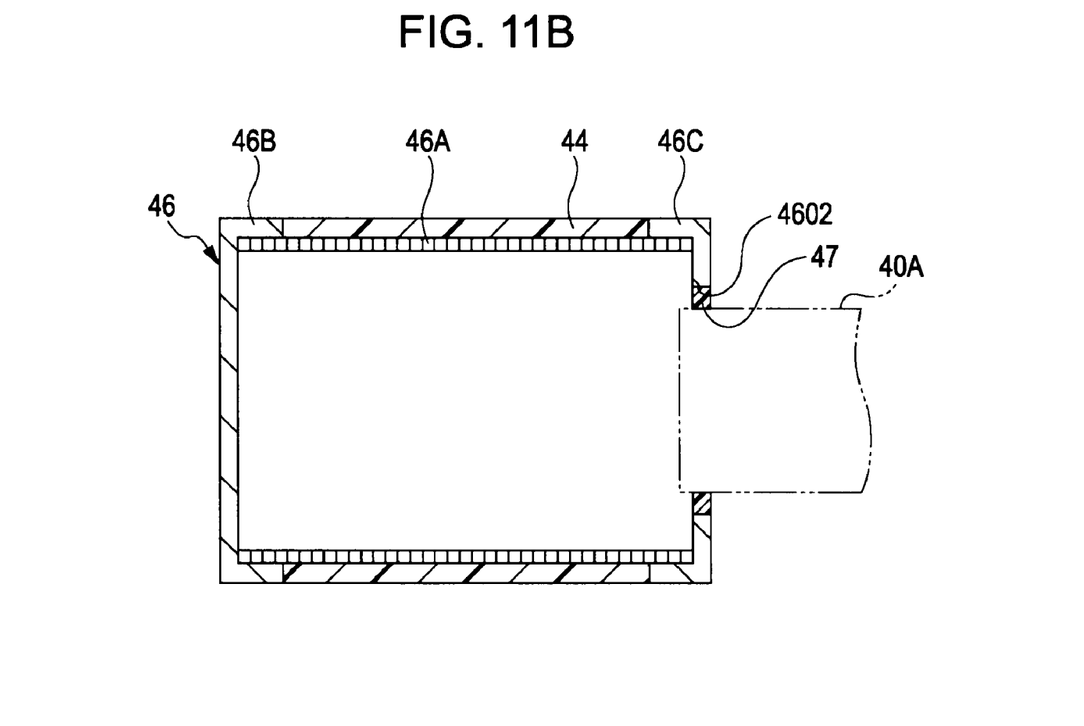
FIG. 11B is a sectional view taken along line XIB-XIB in FIG. 10B.

As shown in FIGS. 10 and 11, the filter body 44 is cylindrical. This filter body 44 can be formed of various synthetic resin materials of the related art, for example, urethane foam. Further, an electrostatic filter for use in an air cleaning device can be used as the filter body 44.

Alternatively, the filter body 44 may be shaped like a so-called bellows bent by alternately forming peaks and troughs, which extend parallel to the center axis of the filter body 44, in the circumferential direction.

The filter support member 46 supports the filter body 44. As shown in FIGS. 11A and 11B, the filter support member 46 includes a cylindrical body 46A formed by a punched metal having multiple holes, and annular plate portions 46B and 46C attached to opposite ends of the cylindrical body 46A.

The annular plate portions 46B and 46C extend in an annular form and coaxially with the filter body 44.

Instead of the punched metal, the cylindrical body 46A can be formed of various materials of the related art that allow air circulation, for example, a mesh structure and a structure having multiple slits.

The cylindrical body 46A and the annular plate portions 46B and 46C are coaxially provided, and the filter body 44 is mounted on the cylindrical body 46A.

In a state in which the filter body 44 is mounted on the cylindrical body 46A, the annular plate portions 46B and 46C are exposed from opposite axial ends of the filter body 44.

One annular plate portion 46B is provided with its end face closed, and the other annular plate portion 46C has an aperture 4602 in its end face. The suction port (suction duct) 40A of the fan 40 is fitted in the filter support member 46 through the aperture 4602.

Referring to FIGS. 10C and 11B, a gasket 47 is attached to the entire inner peripheral surface of the aperture 4602, and fills the gap between the aperture 4602 and the suction port 40A. The gasket 47 can be formed of various synthetic resin materials of the related art, for example, urethane foam.

Figure 6:
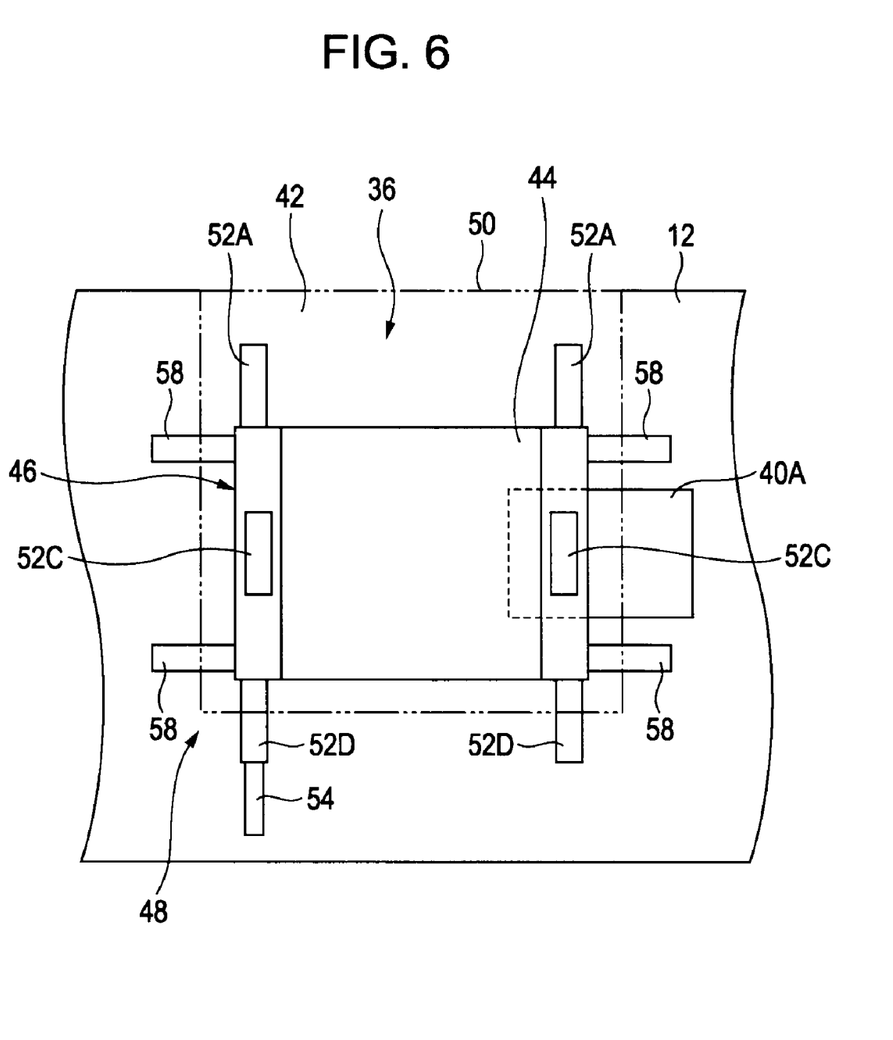
FIG. 6 is a front view illustrating a state in which a cover plate of a filter storage chamber is closed.
Figure 7:
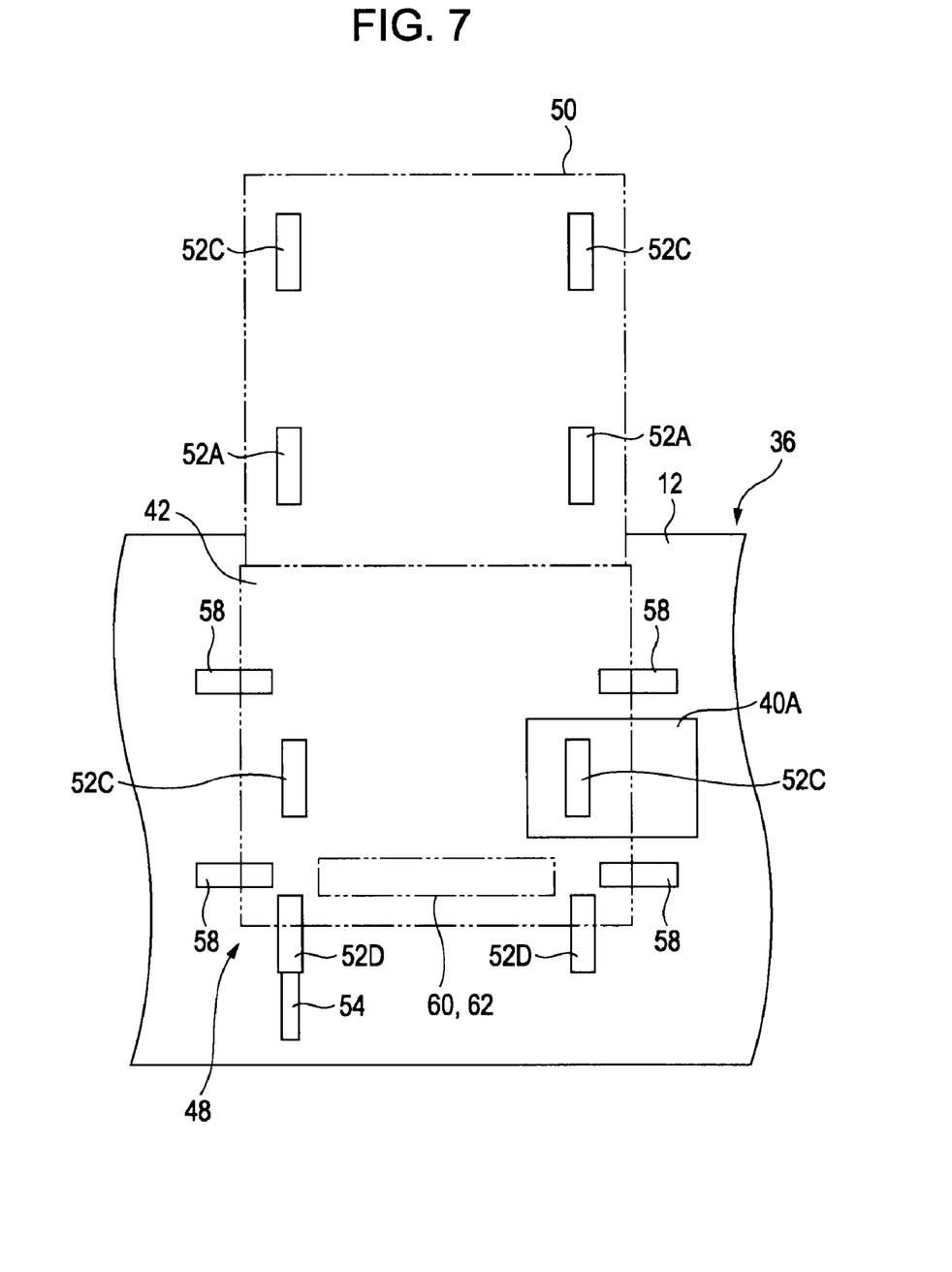
FIG. 7 is a front view illustrating a state in which the cover plate of the filter storage chamber is open.
Figure 8:
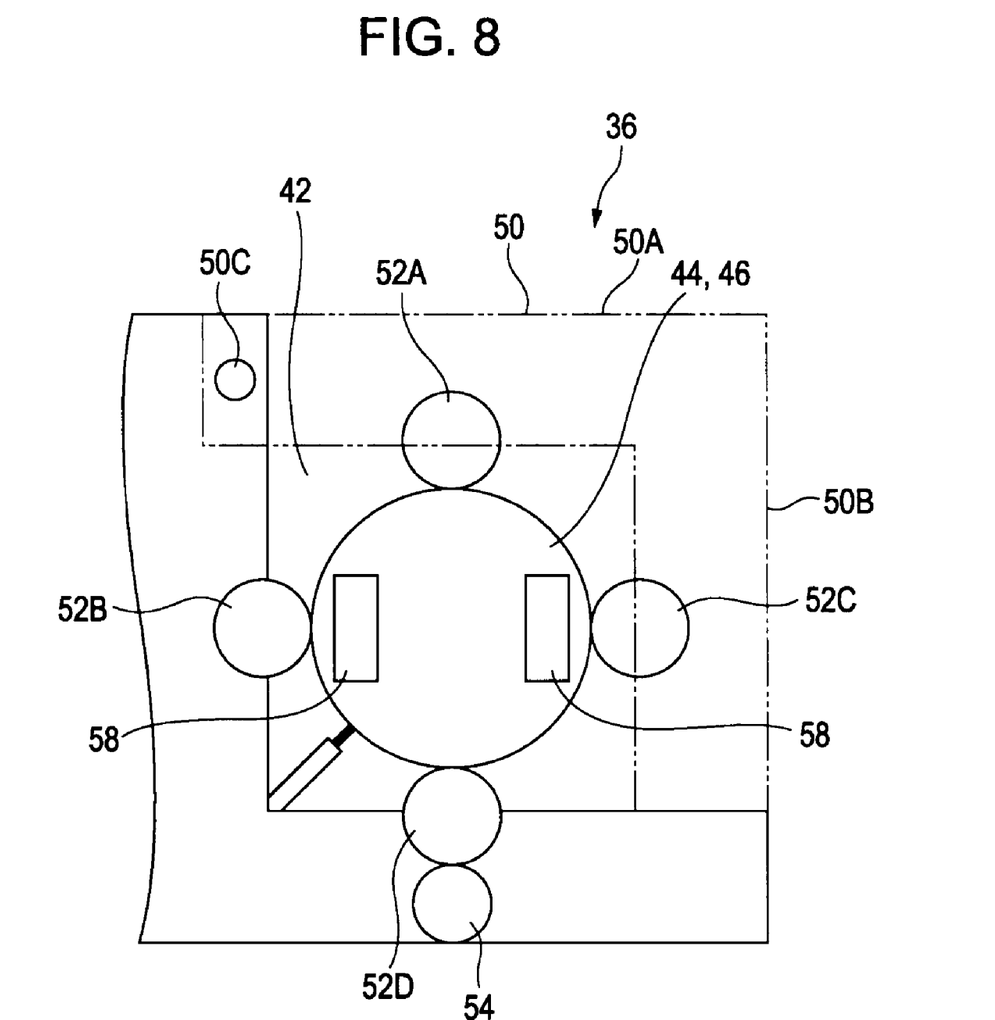
FIG. 8 is a side view illustrating a state in which the cover plate of the filter storage chamber is closed.
Figure 9:
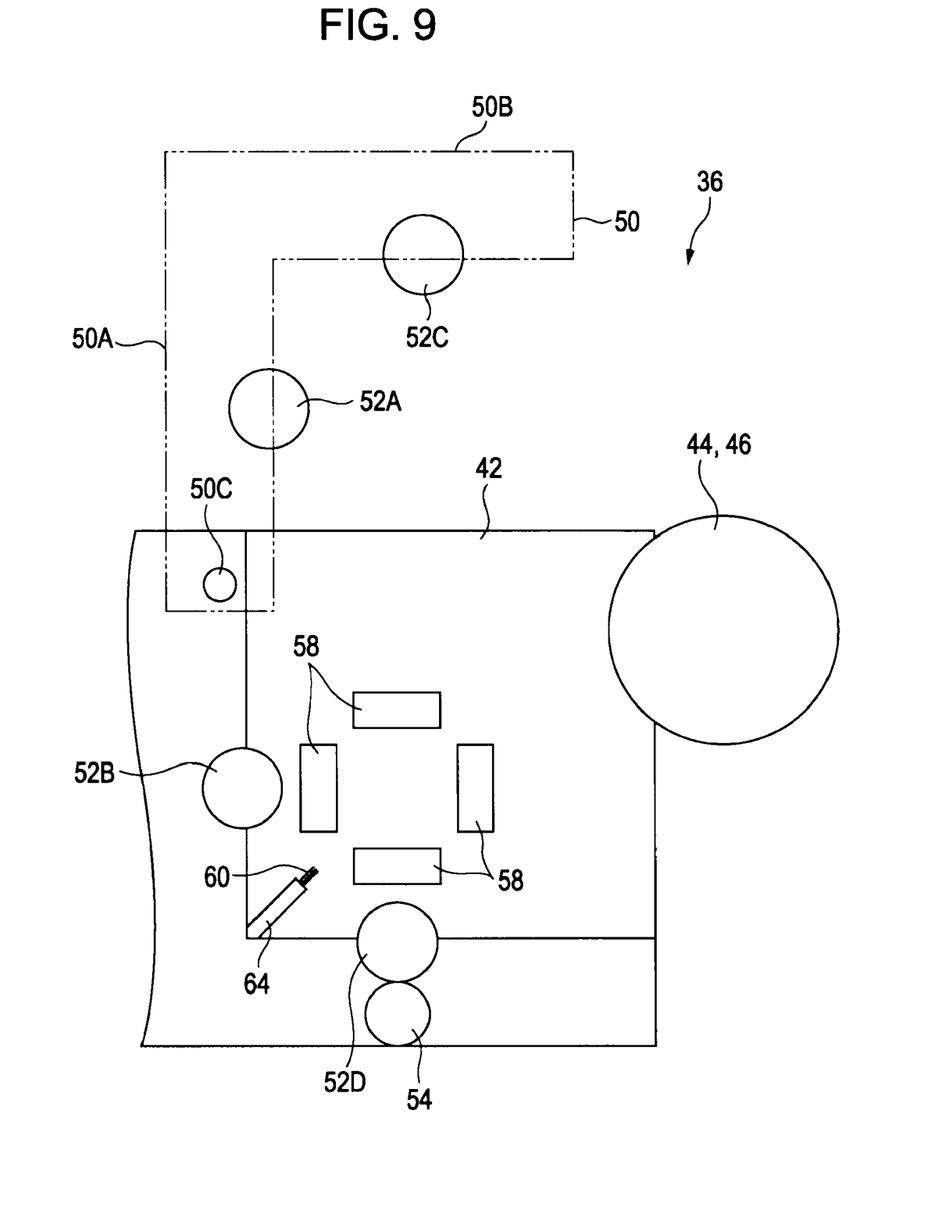
FIG. 9 is a side view illustrating a state in which the cover plate of the filter storage chamber is open.

FIG. 6 is a front view illustrating a state in which a cover plate 50 of the filter storage chamber 42 is closed, and FIG. 7 is a front view illustrating a state in which the cover plate 50 is open. FIG. 8 is a side view illustrating the state in which the cover plate 50 is closed, and FIG. 9 is a side view illustrating the state in which the cover plate 50 is open.

As shown in FIGS. 6 to 9, the filter storage chamber 42 stores the filter body 44 and the filter support member 46, and is opened and closed by the cover plate 50.

The cover plate 50 includes an upper face portion 50A to face an upper side of an outer peripheral surface of the filter body 44, and a side face portion 50B to face a vertical middle portion of the outer peripheral surface of the filter body 44.

A portion of the upper face portion 50A opposite the side face portion 50B is pivotally coupled to the housing 12 by a hinge 50C.

In the first embodiment, the upper face portion 50A forms a right side portion of the upper surface 12C of the housing 12, and the side face portion 50B forms most of the right surface 12F of the housing 12. Further, the above-described slits that form the air inlets 20 are provided over the entire side face portion 50B.

Referring to FIGS. 6 to 9, the rotating unit 48 rotates the filter support member 46 on the center axis of the filter body 44.

The rotating unit 48 have, at a plurality of positions spaced in the circumferential directions of the annular plate portions 46B and 46C, a plurality of rollers 52 that are in rotating contact with the annular plate portions 46B and 46C so as to support the filter support member 46 rotatably.

The rollers 52 include upper rollers 52A in contact with the upper portions of the annular plate portions 46B and 46C, side rollers 52B and 52C provided on two sides to be in contact with the vertical middle portions of the annular plate portions 46B and 46C, and lower rollers 52D in contact with the lower portions of the annular plate portions 46B and 46C.

In the first embodiment, the lower rollers 52D are driven rotationally. The lower rollers 52D may be rotated by elastic contact with a driving roller 54 attached to an output shaft of a motor (not shown), or by coupling to a belt pulley mechanism 56, as shown in FIG. 3.

The timing, frequency, and time period of rotation of the filter body 44 by the rotating unit 48 can be determined arbitrarily.

For example, the filter body 44 may be rotated for a predetermined time at power-on of the projector apparatus 10. Alternatively, the filter body 44 may be continuously or intermittently rotated during operation of the projector apparatus 10.

The upper rollers 52A and the side rollers 52C are rotatably supported by the cover plate 50. The lower rollers 52D and the other side rollers 52B are rotatably supported by the housing 12.

When the cover plate 50 is opened, the upper rollers 52A and the side rollers 52C are placed above the filter storage chamber 42, so that the filter support member 46 on which the filter body 44 is mounted can be inserted and removed.

Since the filter body 44 and the filter support member 46 can thus be replaced by an extremely easy operation of opening the cover plate 50, maintenance is facilitated.

In FIGS. 6 to 9, a plurality of regulation rollers 58 regulate the movement of the filter support member 46 in the axial direction of the filter body 44 by being in contact with the end faces of the annular plate portions 46B and 46C. These regulation rollers 58 are provided in the housing 12.

In the air filter section 36, outside air reaches an inner peripheral portion from an outer peripheral surface of the filter body 44, where dust is removed from the outside air by the filter body 44. The outside air then flows in the axial direction of the filter body 44, and comes out of the filter body 44. In the first embodiment, the outside air coming out of the interior of the filter body 44 flows through the cooling passage 38 via the suction port 40A and the exhaust port of the fan 40.

Figure 12:
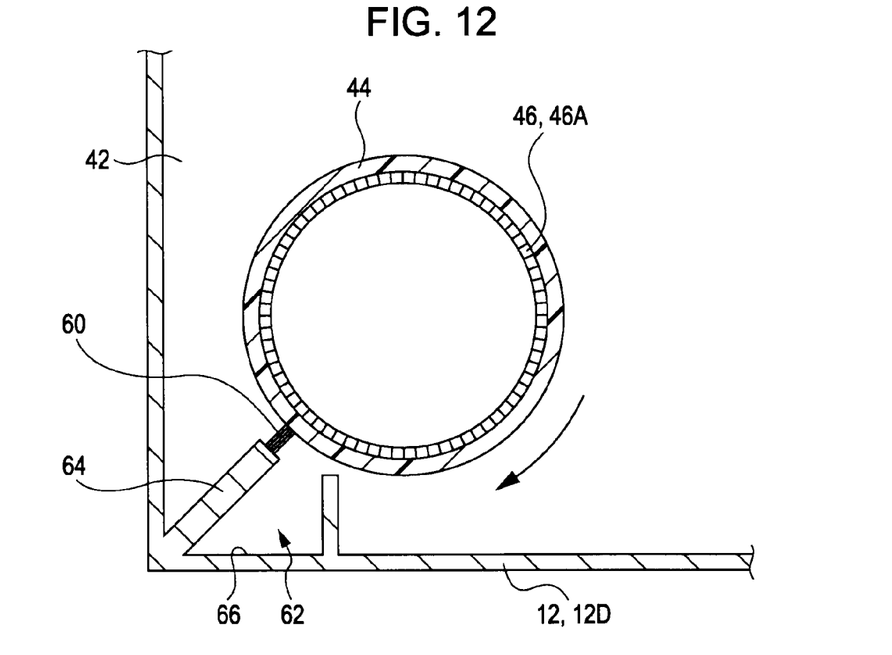
FIG. 12 is an explanatory view illustrating structures of a brush and a dust chamber.

Referring to FIG. 12, the air filter section 36 further includes a brush 60 and a dust receiving portion 62.

The brush 60 is provided via a support member 64 in a manner such as to be in contact with the outer peripheral surface of the filter body 44. More specifically, a leading end portion of the brush 60 linearly extends parallel to the center axis of the filter body 44 over the entire length of the filter body 44.

The dust receiving portion 62 receives dust scraped off by the brush 60. The dust receiving portion 62 is provided on an upstream side of the brush 60 in the rotating direction of the outer peripheral surface of the filter body 44, and at the bottom of the housing 12 with a wall 66 being disposed therebetween.

Hence, when the filter body 44 rotates, dust adhering to the outer peripheral surface of the filter body 44, especially relatively large dust, such as fluff, is scraped off by the brush 60, and is put into the dust receiving portion 62.

A portion including the dust receiving portion 62, the support member 64, the wall 66 (a portion of the bottom of the housing 12) may be detachable from the housing 12. With this structure, maintenance operations, such as removal of dust from the dust receiving portion 62 and cleaning and washing of the brush 60, can be performed easily.

Next, the operation of the cooling device 18 will be described.

When the projector apparatus 10 is powered on, the fan 40 of the cooling device 18 rotates.

By rotation of the fan 40, outside air is taken into the housing 12 through the air inlets 20.

The air taken in the housing 12 flows from the outer peripheral surface to the inner peripheral portion of the filter body 44, where dust is removed from the air by the filter body 44. Then, the air is sucked into the suction port 40A of the fan 40.

The sucked air flows through the remaining portion of the cooling passage 38 via the exhaust port of the fan 40, that is, flows through the light source device 14 and the image projecting unit 16, thereby cooling the light source device 14 and the image projecting unit 16.

After cooling the light source device 14 and the image projecting unit 16, the air is exhausted from the housing 12 through the air outlets 22.

In this case, every time the filter body 44 is rotated by the rotating unit 48, the portion of the filter body 44 where the outside air flows from the outer peripheral surface to the inner peripheral portion of the filter body 44 changes.

According to the first embodiment, the filter body 44 is cylindrical and is rotated by rotating the filter support member 46 on the center axis of the filter body 44. For this reason, even if the amount of outside air flowing through the filter body 44 is not uniformly distributed on the outer peripheral surface of the filter body 44, but concentrates at a certain portion, concentration of dust at a portion of the filter body 44 is suppressed by the rotation of the filter body 44.

Hence, dust uniformly adheres to the entire filter body 44, and partial clogging of the filter body 44 due to dust rarely occurs. Accordingly, even when the filter body 44 is used for a long period, the amount of passing air does not easily decrease, and this suppresses reduction of the cooling effect and extends the life of the filter body 44, in other words, the filter member.

Further, since the filter body 44 is cylindrical, size reduction of the illumination optical unit 24 and size reduction of the projector apparatus 10 can be achieved while ensuring the surface area of the filter body 44.

Still further, since the filter body 44 is cylindrical, the surface area of the filter body 44 is ensured. For this reason, even if the rotation of the filter body 44 is stopped by trouble of the rotating unit 48, clogging with dust will not occur in a short time.

Since the fan 40 communicates with the inner peripheral portion of the filter body 44 via the suction port 40A, noise caused by the fan 40 can be suppressed by the sound absorbing effect of the filter body 44, and this achieves noise reduction of the projector apparatus 10.

While the air inlets 20 are provided in the side face portion 50B facing the vertical middle portion of the outer peripheral surface of the filter body 44 in the first embodiment, since the filter body 44 is cylindrical, air inlets 20 can be added in the upper surface 12C of the housing 12 facing the upper side of the filter body 44 or the lower surface 12D of the housing 12 facing the lower side of the filter body 44.

By thus forming the air inlets 20 at a plurality of positions, the amount of outside air to be sucked into the housing 12 is increased and the cooling ability of the cooling device 18 is enhanced.

Air inlets 20 may be added in the front surface 12A of the housing 12 facing the annular plate portion 46B. In this case, the amount of outside air to be sucked into the housing 12 is further increased, and the cooling ability of the cooling device 18 is further enhanced.

Second Embodiment

Next, a second embodiment will be described.

Figure 13:
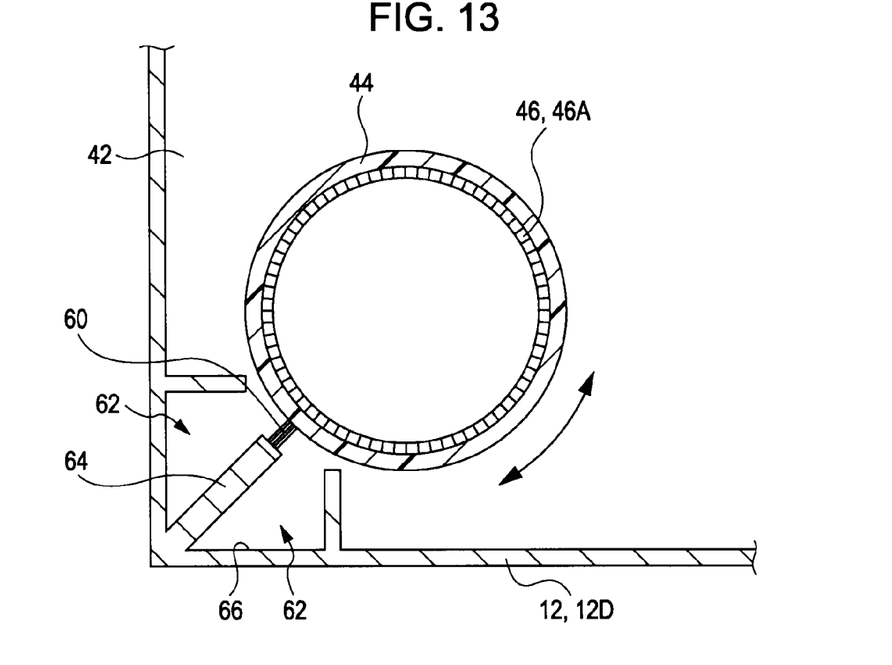
FIG. 13 is an explanatory view illustrating structures of a brush and a dust chamber according to a second embodiment.

FIG. 13 illustrates structures of a brush 60 and a dust receiving portion 62 in the second embodiment. In the second embodiment, components identical or similar to those adopted in the first embodiment are denoted by the same reference numerals, and redundant descriptions thereof are omitted.

The second embodiment is a modification of the first embodiment, and is different from the first embodiment in the structure of the dust receiving portion 62.

A rotating unit 48 (FIG. 5) rotates a filter support member 46 in forward and reverse directions.

As shown in FIG. 13, the dust receiving portion 62 is provided on each of the upstream and downstream sides, in the rotating direction of an outer peripheral surface of a filter body 44, of a position where the brush 60 is in contact with the outer peripheral surface.

The above-described second embodiment provides advantages similar to those of the first embodiment.

Further, since the filter support member 46 is rotated in the forward and reverse directions, dust adhering to the outer peripheral surface of the filter body 44 is scraped off by the brush 60 and is put into the two dust receiving portions 62, regardless of the rotating direction of the filter body 44.

Hence, more dust can be reliably received by the two dust receiving portions 62 than in the first embodiment, and this reduces the load of maintenance of the dust receiving portions 62.

Third Embodiment

Next, a third embodiment will be described.

Figure 14:
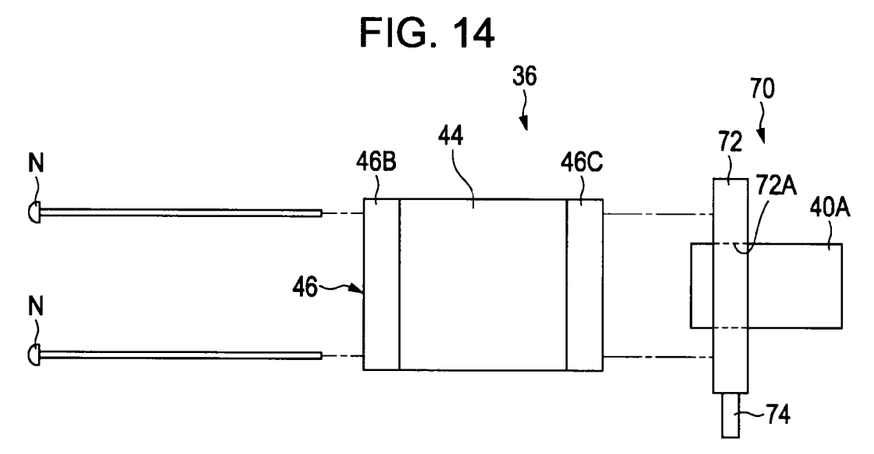
FIG. 14 is an explanatory view illustrating a structure of an air filter section according to a third embodiment.

FIG. 14 illustrates a structure of an air filter section 36 in the third embodiment.

The third embodiment is a modification of the first embodiment, and is different from the first embodiment in a structure of a rotating unit.

As shown in FIG. 14, a rotating unit 70 includes a base 72 and a driving roller 74.

The base 72 is shaped like an annular plate, and is rotatably supported by a housing 12. An opening 72A in which a suction port 40A of a fan 40 is fitted is provided in the center of the base 72. To fill the gap between an inner peripheral surface of the opening 72A and the suction port 40A, a gasket (not shown) is provided over the entire inner peripheral surface of the opening 72A. This gasket prevents air that does not pass through the filter body 44 from being guided to the suction port 40A from the gap.

One annular plate portion 46C of a filter support member 46 is combined with the base 72 by screws N in a state in which the center axis of the annular plate portion 46C coincides with the center axis of the base 72.

The driving roller 74 is attached to an output shaft of a motor (not shown), and is in contact with an outer peripheral surface of the base 72.

When the driving roller 74 is rotated by the motor, this rotation rotates the filter support member 46 and the filter body 44 via the base 72.

The above-described third embodiment provides advantages similar to those of the first embodiment.

Further, since the third embodiment does not use a plurality of rollers for rotatably supporting the filter body 44, unlike the rotating unit 48 of the first embodiment, the structure is simplified, and size reduction is achieved.

Fourth Embodiment

Next, a fourth embodiment will be described.

Figure 15:
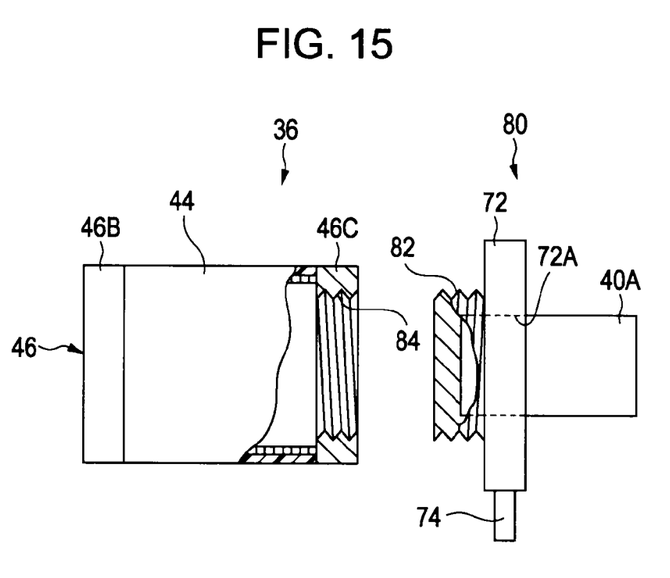
FIG. 15 is an explanatory view illustrating a structure of an air filter section according to a fourth embodiment.

FIG. 15 illustrates a structure of an air filter section 36 in the fourth embodiment.

The fourth embodiment is a modification of the third embodiment, and is different from the third embodiment in a structure of a rotating unit.

As shown in FIG. 15, a rotating unit 80 includes a base 72, a driving roller 74, a male thread portion 82, and a female thread portion 84.

The base 72 and the driving roller 74 have structures similar to those in the third embodiment.

The male thread portion 82 is shaped like a cylinder coaxial with the base 72, and has an inner peripheral surface that surrounds a suction port 40A of a fan 40.

The female thread portion 84 is provided in one annular plate portion 46C of a filter support member 46, and is screwed on the male thread portion 82.

By screwing the female thread portion 84 of the annular plate portion 46C on the male thread portion 82 of the base 72, the filter support member 46 is combined with the base 72 in a state in which the center axis of the filter support member 46 coincides with the center axis of the base 72.

When the driving roller 74 is rotated by a motor (not shown), this rotation rotates the filter support member 46 and a filter body 44 via the base 72.

The above-described fourth embodiment provides advantages similar to those of the third embodiment.

While the single air filter section 36 is provided in the embodiments, two or more air filter sections can, of course, be provided.

The present application contains subject matter related to that disclosed in Japanese Priority Patent Application JP 2009-141005 filed in the Japan Patent Office on Jun. 12, 2009, the entire content of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. A projector apparatus comprising:
a housing having an air inlet and an air outlet;
a light source device provided in the housing;
an image projection unit provided in the housing and configured to generate an image projection light beam from light from the light source device and to emit the image projection light beam so as to project an image onto a screen; and
a cooling device configured to cool the light source device and the image projecting unit,
wherein the cooling device includes a cooling passage extending from the air inlet to the air outlet via an air filter section, the light source device, and the image projecting unit, and a fan configured to suck in outside air from the air inlet, to cause the outside air to flow through the cooling passage, and to exhaust the outside air out of the housing from the air outlet,
wherein the air filter section includes
a cylindrical filter body,
a filter support member configured to support the filter body, and
a rotating unit configured to rotate the filter support member on a center axis of the filter body, and
wherein, in the air filter section, after the outside air flows from an outer peripheral surface to an inner peripheral portion of the filter body and dust is removed from the outside air by the filter body, the outside air flows out of the filter body in an axial direction of the filter body.

2. The projector apparatus according to claim 1,
wherein the filter support member has annular plate portions exposed from both axial ends of the filter body and extending in an annular form coaxially with the filter body,
wherein the air filter section further includes a plurality of rollers in contact with the annular plate portions at a plurality of positions spaced in a circumferential direction of the annular plate portions, the rollers supporting the filter body rotatably, and
wherein the rotating unit rotates a roller of the rollers that is provided at a lower position.

3. The projector apparatus according to claim 2,
wherein the air filter section further includes a filter storage chamber in which the filter body and the filter support member are stored, the filter storage chamber being opened and closed by a cover plate,
wherein the cover plate includes an upper face portion to face an upper portion of the outer peripheral surface of the filter body, and a side face portion to face a vertical middle portion of the outer peripheral surface of the filter body, the side face portion having the air inlet,
wherein the rollers include upper rollers to be in contact with upper portions of the annular plate portions and side rollers to be in contact with vertical middle portions of the annular plate portions, and
wherein the upper rollers and the side rollers are supported by the cover plate.

4. The projector apparatus according to claim 1, wherein the air filter section further includes a brush provided in contact with the outer peripheral surface of the filter body, and a dust receiving portion configured to receive dust scraped off by the brush.

5. The projector apparatus according to claim 4,
wherein the rotating unit rotates the filter support member in forward and reverse directions, and
wherein the dust receiving portion is provided on each of upstream and downstream sides, in a rotating direction of the outer peripheral surface of the filter body, of a position where the brush is in contact with the outer peripheral surface.

6. The projector apparatus according to claim 4,
wherein the dust receiving portion is provided in a portion of a bottom of the housing, and
wherein the portion of the bottom of the housing where the dust receiving portion is provided is detachable from the remaining portion of the housing.

7. The projector apparatus according to claim 1,
wherein the filter support member has annular plate portions exposed from both axial ends of the filter body and extending in an annular form coaxially with the filter body, and
wherein one of the annular plate portions of the filter support member is coupled to a base area of the rotating unit such that the center axis of the annular plate portion coincides with the center axis of the base area of the rotating unit.

8. The projector apparatus according to claim 1,
wherein the filter support member has annular plate portions exposed from both axial ends of the filter body and extending in an annular form coaxially with the filter body, one of the annular plate portions of the filter support member containing a first thread portion, and
wherein a base area of the rotating unit contains a second thread portion which when coupled to the first thread portion of the filter support member couples the filter support member to the base area of the rotating unit such that the center axis of the filter support member coincides with the center axis of the base.

* * * * *